Dec. 15, 1970 E. F. CAVE ET AL 3,548,233

CHARGE STORAGE DEVICE WITH PN JUNCTION DIODE ARRAY TARGET HAVING SEMICONDUCTOR CONTACT PADS

Filed Nov. 29, 1968 2 Sheets-Sheet 1

INVENTORS
ERIC F. CAVE &
FRED C. DUIGON

BY [signature]

ATTORNEY

INVENTORS
ERIC F. CAVE &
FRED C. DUIGON
BY [signature]
ATTORNEY

United States Patent Office 3,548,233

Patented Dec. 15, 1970

3,548,233
CHARGE STORAGE DEVICE WITH PN JUNCTION DIODE ARRAY TARGET HAVING SEMICONDUCTOR CONTACT PADS

Eric F. Cave, Somerville, and Fred C. Duigon, East Brunswick, N.J., assignors to RCA Corporation, a corporation of Delaware Filed Nov. 29, 1968, Ser. No. 779,864
Int. Cl. H01j 29/10, 31/26, 31/28; H01l 3/12, 15/00
U.S. Cl. 313—65 8 Claims

ABSTRACT OF THE DISCLOSURE

A charge storage device of the type having a charge storage target scanned by reading means is provided with a novel diode array target. The target comprises semiconductor pads in contact with the diodes. The pads serve as diffusion source for formation of diode elements of the target. After diffusion, the pads are left on the target as contacts.

BACKGROUND OF THE INVENTION

(1) Field of the invention

The invention relates to charge storage devices having a charge storage target scanned by reading means and particularly concerns a target of the type having an array of diodes.

(2) Description of the prior art

One type of charge storage device is the vidicon camera tube. A vidicon has an evacuated envelope of which one end is a transparent faceplate. On the inside surface of the faceplate is first a transparent conductive signal plate, and on that signal plate is a charge storage target. Inside the other end of the envelope is an electron gun for forming an electron beam to be directed toward the target. In one type of vidicon, electrostatic deflection means are included in the tube for causing the beam to scan a raster on that target surface facing the gun.

Among the types of targets that are used in vidicons are photodiode array targets such as are described in Pats. 3,011,089 to F. W. Reynolds and 3,403,284 to T. M. Buck et al. Generally, such targets include a semiconductor wafer with bulk region of one conductivity type and having an array of discrete regions of another conductivity type on one of its major surfaces. The discrete regions form PN junctions with the bulk region of the wafer. The bulk region surface separating the discrete regions is covered completely with an insulating layer.

One problem with previous targets is that the beam does not land properly on the discrete regions. Charge accumulating on the surface of the insulating layer tends to repel the beam from that surface. When the discrete regions are very small, the amount of insulator surface compared to the amount of discrete region surface that is exposed to the beam is relatively large. As a result, a significant portion of the beam is prevented from landing on the discrete regions by the charge on the insulating layer immediately surrounding the discrete region. To improve the beam landing, separate round metal pads are placed over and in electrical contact with the surface of the discrete regions and overlapping the insulating layer surrounding the discrete regions. The pads increase the amount of landing area for the discrete regions and decrease the amount of exposed insulating area, to result in improved beam landing. Such pads have the disadvantage that when any part of them contacts the bulk region there is a direct short circuit between the bulk region and the beam. Such a short circuit shows in the picture from the target as a bright spot blemish. Contact to the bulk region occurs, for instance, when there is misregistration of the openings in the insulating layer with the discrete regions, or when the metal contacts the bulk region through a fault in the insulating layer, such as a pinhole. Moreover, the evaporation method of forming metal pads results in a relatively high percentage of inoperative diodes, since frequently a formed pad fails to make direct contact to a clean portion of the discrete region surface.

During diffusion to make the discrete regions, a thin insulator coating forms on the discrete region surface. It is necessary to remove this coating before putting the pads on the discrete regions. Removal of the coating results in considerable undercutting of the insulating layer on the bulk region surface. Thus there is a greater likelihood that the bulk region might be exposed and contacted by a pad to create a short circuit.

SUMMARY OF THE INVENTION

A charge storage device of the type having a charge storage target and reading means is provided with a novel target. The target comprises a semiconductor wafer with opposed first and second major wafer surfaces. The wafer has an array of discrete regions of a first conductivity type and a bulk region of a second conductivity type. The discrete regions are on the second major surface and extend into the wafer a distance less than the wafer thickness. The bulk region is defined as the region between the first and second wafer surfaces, exclusive of the discrete regions. An electrically insulating layer covers the second wafer surface where it is of the second conductivity type. A semiconductor pad covers and is in electrical contact with each discrete region.

The semiconductor pads improve the contact of the reading means to the discrete areas and can be used as the diffusion source for the discrete regions. In addition, contact of a pad to the bulk region, such as may result from misregistration of discrete regions with openings in the insulating layer or from entry of the pad material into a pinhole in the insulating layer, does not result in a short circuit there. Instead, it results in the formation of a separate PN junction at the place of contact, since there will be a diffusing into the bulk region there. This separate PN junction does not affect the performance quality of the target, as it is unnoticeable in the target signal. Since the diffusion is from the pads, no insulating coating forms on the discrete regions. Thus the step of removing such a coating before putting pads on the discrete regions is entirely eliminated to result in an improved target.

DESCRIPTION OF THE PREFERRED EMBODIMENT

Figure 1:
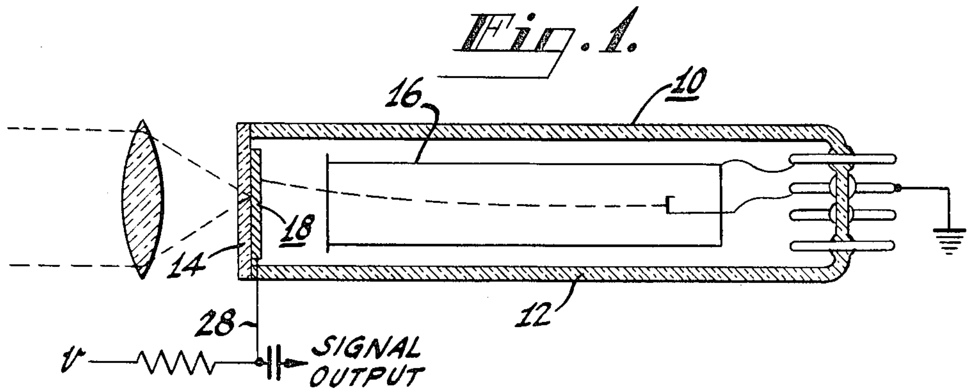
FIG. 1 is a side sectional view of an improved vidicon camera tube utilizing the invention.

A preferred embodiment of the invention is a vidicon type camera tube 10 as shown in FIG. 1. having an evacuated envelope 12, a transparent faceplate 14 at one end of the envelope 12, an electron gun 16 inside the envelope for forming an electron beam, and a target 18 adjacent the inside surface of the faceplate 14. Means (not shown) for directing the beam toward the target 18 and for causing the beam to scan the target 18 surface may be disposed inside the envelope 12.

Figure 2:
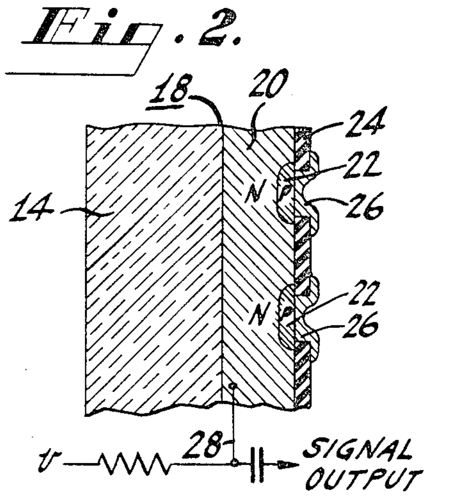
FIG. 2 is a fragmentary sectional view of the target in the tube of FIG. 1.

The target 18, a fragment of which is shown in FIG. 2, is a silicon photodiode wafer. It is formed with a round single crystal of silicon about 1.0 inch in diameter and about 20 microns thick. The bulk region 20 of the wafer is doped N type with phosphorus to a level of about $2\times10^{13}$ atoms/cm.$^3$ to about $10^{16}$ atoms/cm.$^3$.

On one major surface of the wafer is an array of p type discrete regions 22. The discrete regions are spaced at about 25.4 microns from center to center, are about 7 microns in diameter and extend about 3 microns into the wafer. Each discrete region 22 forms a PN junction photodiode with the N type bulk region 20 of the wafer. The dopant in the discrete regions 22 is boron.

Covering the surface of the N type bulk region 20 which separates the P type discrete regions 22 is an insulating layer 24 of silicon dioxide to a thickness of about 0.4 to about 1.5 microns.

Covering the surface of each P type discrete region 22 and overlapping the edge of the insulating layer 24 is a polycrystalline pad 26 of degenerately doped silicon about 0.6 micron thick. The dopant in the pads is boron, whose concentration is on the order of $10^{19}$ atoms per cubic centimeter. The resistivity of the pads 26 is on the order of 30Ω per square.

The target 18 may be fabricated by the following process: First a silicon dioxide insulating layer 24 about 0.8 micron thick is grown on one major surface of a 127 microns thick very high purity silicon wafer by heating the wafer for about one hour at about 1100° C. in an atmosphere of steam. Using well known photoresist techniques, an array of openings about 7 microns in diameter with a spacing of about 25.4 microns from center to center is etched through the insulating layer 24 to expose discrete areas of the wafer surface. A layer of silicon about 0.6 micron thick heavily doped with boron is then vapor phase deposited on the exposed discrete areas and on the insulating layer 24. The layer of silicon is then etched, using photoresist techniques, to form pads 26 in the openings and overlapping to some extent the adjacent insulating layer 24. The pads 26 do not contact each other. The pads are generally square-shaped, measuring about 17 microns on a side. The wafer is then baked in a dry furnace at about 1200° C. for about 5 minutes, slowly cooled to about 750° C. over a period of about 2 hours, and then cooled to room temperature. During the baking some of the dopant in the pads 26 diffuses into the wafer and forms P type discrete regions 22 therein. These discrete regions 22 form PN junctions with the N type bulk region 20 and extend into the wafer a distance of about 3 microns. The non-diffused face of the wafer is then etched chemically until the wafer thickness is about 20 microns. A thicker region may be retained around the periphery for structural support.

The non-diffused side of the target 18 is placed adjacent the inside surface of the faceplate 14 with the opposite side, that having the pads 26, toward the scanning means 16.

When the target 18 is operated in the vidicon 10, the N type bulk region 20 is normally biased at a potential "$v$" a few volts positive in relation to the cathode potential of the gun 16. The scanning beam impinges in turn on each pad 26. Beam electrons are conducted through the pads 26 to the P type region 22. Addition of electrons to the discrete region 22 puts the PN junction there in a state of back-bias, allowing the charge to accumulate until the discrete region 22 and the pad 26 reach cathode potential and repel the beam. In the dark, a relatively good diode can retain most of the charge in its discrete region 22 for a considerable time. However, if light is absorbed in the N type bulk region 20, charge carriers are formed there which migrate to the PN junction and result in leakage of charge from the discrete region 22. When the beam next scans the pad 26 of the discharged discrete region 22, it brings the discrete region quickly back to cathode potential. The sudden fluctuation of potential in the discrete region 22 results by capacitive coupling in a corresponding current fluctuation in the N type bulk region 20. The N type bulk region 20 is sufficiently conductive to serve as a signal plate for the target 18, and the current fluctuations in it may be transferred through an electrical contact 28 to conventional video signal processing equipment (not shown).

Although after diffusion the pads 26 have a doping level on the order of $10^{19}$ atoms/cm.$^3$ and a resistivity on the order of 30 ohms per square, a somewhat higher resistivity than metals, their action in conducting the beam electrons to the P type regions 22 is quite adequate for normal video frame rates. The beam is a high enough impedance source that such pad 26 resistance is relatively immaterial.

GENERAL CONSIDERATIONS

While the preferred embodiment of the invention is a vidicon camera tube, the invention encompasses other types of charge storage devices which have a charge storage target addressed by a reading means. Such devices may be, for example, storage tubes, scan conversion tubes, or solid state image sensors. The various modes of operation of the present invention as one of such devices and the voltages to be applied for such modes are well known to those skilled in the art, and are discussed, for instance, in the issued Pat. 3,403,284 to T. M. Buck et al., mentioned earlier. For instance, in the secondary emission mode, the conductivity type of the discrete regions 22 and the bulk region 20 are reversed, so that the discrete regions 22 are made N type whereas the bulk region 20 is P type. The scanned side of the target 18 is brought to the potential of the accelerating mesh of the gun 16 by secondary emission.

The novel target 18 may be comprised of a monocrystalline wafer of silicon as in the preferred embodiment of a polycrystalline wafer of silicon, or of a single or polycrystalline wafer of another semiconductor such as germanium, gallium arsenide or gallium arsenide phosphide. The diodes may be of the mesa type or any other type. The pads 26 need not necessarily be of the same semiconductor material as the bulk region 20 so long as they are doped semiconductor material of relatively low resistance. The pad 26 material should itself be a material or contain a material that is a conductivity modifier capable of altering the conductivity type of the wafer material to form discrete regions and, therewith, PN junctions. Such conductivity modifiers may be, for example, elements of Groups III and V of the Periodic Table in the case of silicon or germanium and elements of the Groups II, IV, and VI in the case of III–V compounds such as gallium arsenide. Such conductivity modifiers may also be diffused through pads 26 which were formed on the target 18 in an undoped state.

For optimum sensitivity of the target 18 it is desirable that the wafer thickness be on the order of the average carrier diffusion length in the wafer. This assures that enough of the light-generated carriers will be able to reach one of the discrete regions 22. For best response to short wavelengths such as blue and for good resolution, the wafer should be made as thin as possible. In operation, the field-free region of the wafer should preferably be minimized by applying voltages to the wafer which bring the depletion region almost to the lighted target 18 surface. In this condition, light-generated carriers in the field free region will be more likely to reach the depletion region. Once they reach the depletion region they are very likely under the influence of the relatively strong field there to reach the discrete regions. Trapping of carriers at the lighted surface can be minimized by the formation of an accumulation region there to drive the carriers away from the surface. The accumulation region can be formed by a shallow diffusion of N type impurities on the lighted surface.

The pads 26 of the preferred embodiment are of a generally square shape in order that the ratio of pad 26 surface to insulating layer 24 surface exposed to the beam be a maximum while at the same time there be sufficient insulating layer 24 surface to prevent leakage between pads 26. The pads 26 could, of course, be any of a variety of shapes.

Figure 4:
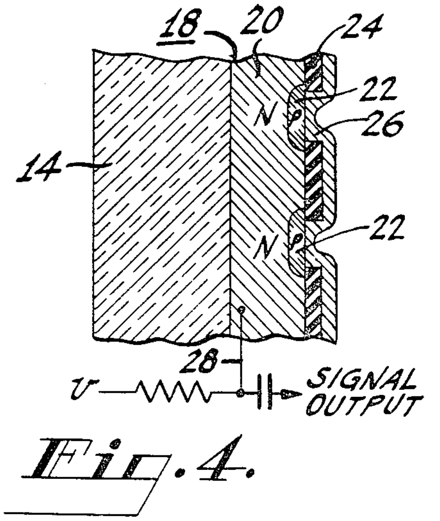
FIG. 4 is a fragmentary side sectional view of another embodiment of the target.
Figure 5:
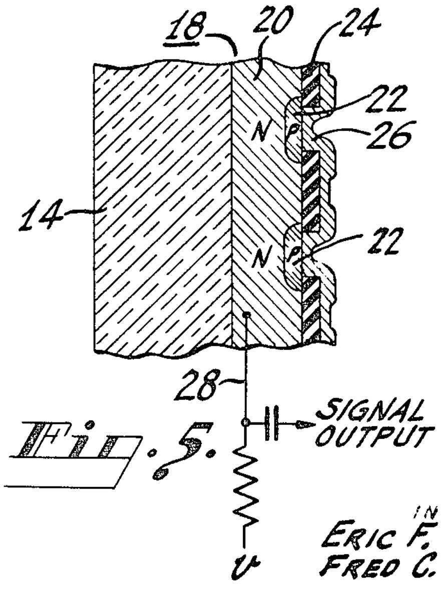
FIG. 5 is a fragmentary side sectional view of yet another embodiment of the target.

The pads 26 need not be separate from one another to perform their function. Moreover, they may be monocrystalline, polycrystalline, amorphous, or a combination thereof. They may be provided in the form of a single, amorphous, doped contact layer of joined pads 26 on the beam side of the target 18 as is shown in FIG. 4. The contact layer may be of uniform thickness or be thinned in the insulating layer 24 regions as shown in FIG. 5 by, for example, etching. The layer would serve as the diffusion source for the discrete regions 22. Even a uniformly thick contact layer may function according to the present invention. The contact layer thickness may be chosen to give a lateral resistance great enough so that there is no appreciable surface current between one discrete region 22 and another one near it. Yet at the same time, the resistance through the small thickness of the contact layer can be relatively low, allowing each pad 26 to act in a rather independent fashion.

The insulating layer 24 separating the bulk region 20 surface from the beam may be made of any of a number of insulating materials, such as for instance glass, that are suitable as an insulating coating under the conditions required for fabrication of the target and for operation of the tube 10. For the case of a silicon wafer, we prefer to use silicon dioxide because of its refractory properties and the relative ease with which it may be formed.

The lighted side of the target may be supplied with antireflective, transparent coatings to improve the optical coupling between the target and any associated optics such as the faceplate of the vidicon 10. It may also be provided with an $N^+$ type accumulation region to reduce surface recombination at the lighted surface.

Figure 3:
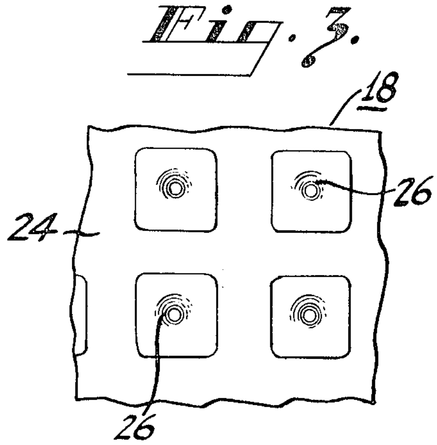
FIG. 3 is a view of a fragment of the scanned surface of the target of FIG. 2.
Figure 6:
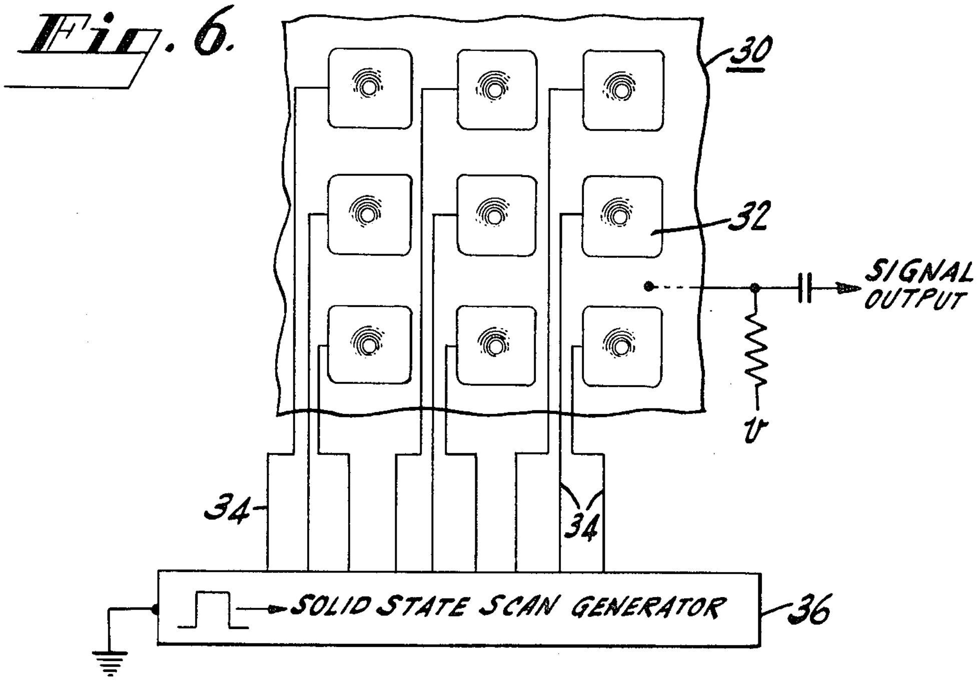
FIG. 6 is a view of a fragment of the scanned surface of the target of FIG. 2 with a solid state scanning system shown schematically and connected to the target.

In a vidicon, the reading of the target is accomplished by contacting the individual target elements, such as the diodes in an array, with an electron beam. When a target has discrete elements, such as in a diode array, however, the function of the electron beam may be performed by contacting each element with an electrical conductor and then scanning the conductors with solid state circuitry. FIG. 6 shows a fragment of the scanned surface of a target 30 of the same general structure as the target of FIG. 3 but whose pads 32 are connected by the conductors 34 to a solid state scan generator 36 shown schematically. The scan generator 36 successively connects each pad to a reference potential "*v*" which may be the same potential to which the beam in a vidicon brings the pads. Aside from the manner in which the pads are returned to a reference potential, the operation of a vidicon and the solid state device of FIG. 6 are substantially the same. Solid state scanning of this type is discussed, for instance, by G. Sadasiv, P. K. Weimer, and W. S. Pike in "Thin-Film Circuits for Scanning Image-Sensor Array," IEEE Transactions on Electron Devices, vol. ED-15, No. 4, April 1968.

Each of the embodiments may be operated with voltages, currents and frequencies normally used for devices of the particular type. In this respect the targets are compatible with existing structures and do not require special treatment for successful operation.

I claim:

1. A charge storage device of the type having a charge storage target with opposed first and second major target surfaces and reading means for selectively contacting portions of the first major target surface, said target comprising:

(a) a semiconducting wafer having a thickness and spaced, opposed first and second major wafer surfaces and comprising:

(1) an array of discrete regions on said first wafer surface and extending into said wafer a distance less than said wafer thickness, said discrete regions being of a first conductivity type;

(2) a bulk region in said wafer defined as a region between said first and second wafer surfaces bounded at said first wafer surface by said discrete regions and by that portion of said first wafer surface between said discrete regions, said bulk region being of a second conductivity type;

(b) an electrically-insulating layer on said first wafer surface covering the surface areas of said second conductivity type; and (c) an array of semiconductor pads on said first wafer surface and in electrical contact with the areas of the first conductivity type, said pads containing a dopant for making the material of said bulk region a first conductivity type.

2. The device defined in claim 1 and wherein said bulk region is N type silicon.

3. The target defined in claim 2 and wherein said bulk region has a resistivity of about 0.5 Ω-cm. and higher.

4. The target defined in claim 1 and wherein said pads are generally square in shape.

5. The device defined in claim 1 and wherein said pads and said discrete regions contain the same dopant.

6. A vidicon camera tube charge storage target, comprising:

(a) a wafer of N type silicon with opposed first and second major surfaces and having a resistivity on the order of 0.5 Ω-cm. to 200 Ω-cm.;

(b) an array of discrete P type silicon regions on said second wafer surface;

(c) an electrically insulating layer covering the area of said second major surface between said discrete regions; and, (d) contact pads of silicon in contact with and covering said discrete regions, said pads being diffusion sources for said discrete regions.

7. The target defined in claim 6 and wherein said contact pads contain a P type dopant which renders silicon P type.

8. The target defined in claim 7 and wherein said pads are doped to degeneracy.

References Cited

UNITED STATES PATENTS

| | | | |
|---|---|---|---|
| 3,011,089 | 11/1961 | Reynolds | 313—65 |
| 3,403,284 | 9/1968 | Buck et al. | 313—65 |
| 3,419,746 | 12/1968 | Crowell et al. | 315—10 |
| 3,440,477 | 4/1969 | Crowell et al. | 315—11 |

JAMES W. LAWRENCE, Primary Examiner

V. LAFRANCHI, Assistant Examiner

U.S. Cl. X.R.

313—89; 315—10; 317—235